(12) United States Patent
Cummins

(10) Patent No.: US 6,506,002 B1
(45) Date of Patent: Jan. 14, 2003

(54) TURRET HAND DRILL

(76) Inventor: Richard D. Cummins, 33 Harmony Cir., Orchard Park, NY (US) 14127

( * ) Notice: Subject to any disclaimer, the term of this patent is extended or adjusted under 35 U.S.C. 154(b) by 0 days.

(21) Appl. No.: 09/831,205

(22) PCT Filed: Apr. 5, 2000

(86) PCT No.: PCT/US00/09080

§ 371 (c)(1),
(2), (4) Date: May 7, 2001

(87) PCT Pub. No.: WO01/17728

PCT Pub. Date: Mar. 15, 2001

Related U.S. Application Data

(60) Provisional application No. 60/153,181, filed on Sep. 10, 1999.

(51) Int. Cl.[7] .............................................. B23B 45/00
(52) U.S. Cl. ...................................... 408/35; 408/124
(58) Field of Search ..................... 408/35, 124, 117; 7/158, 165; 81/57.22, 57.23; 173/46; 279/14; 483/50, 51, 55, 56

(56) References Cited

U.S. PATENT DOCUMENTS

| | | | |
|---|---|---|---|
| 1,022,711 A | 4/1912 | Sweet | |
| 2,303,565 A | 12/1942 | Luna | 77/25 |
| 2,679,770 A | 6/1954 | Carter et al. | 77/25 |
| 2,919,609 A | 1/1960 | Klingbeil | 77/7 |
| 4,536,113 A | 8/1985 | Hatfield | 409/234 |
| 4,604,005 A | 8/1986 | Russ | 408/35 |
| 4,928,381 A | 5/1990 | Yaguchi et al. | 29/568 |
| 5,022,131 A | 6/1991 | Hobbs | 29/40 |
| 5,065,498 A | 11/1991 | McKenzie | 29/568 |
| 5,149,230 A * | 9/1992 | Nett | 408/125 |
| 5,346,453 A | 9/1994 | Rivera-Bottzeck | 483/1 |
| 5,573,358 A | 11/1996 | Gobbers et al. | 408/35 |
| 5,893,685 A | 4/1999 | Olson et al. | 408/35 |

FOREIGN PATENT DOCUMENTS

| | | |
|---|---|---|
| DE | 38 31 132 A1 | 6/1989 |
| DE | 43 40 740 A1 | 6/1995 |
| GB | 1073681 | 6/1967 |

* cited by examiner

*Primary Examiner*—Daniel W. Howell
(74) *Attorney, Agent, or Firm*—Simpson & Simpson, PLLC

(57) ABSTRACT

A turret hand drill (10) features a turret (22) mounted on the drill for swivel motion about a pivot axis (5) angularly spaced from the tool drive axis (3) of the drill between a pair of opposite index positions. The turret (22) includes a pair of chuck assemblies (26A,26B) arranged symmetrically about and coplanar with the pivot axis (5) of the turret (22) for selective positioning in alignment with the drill tool drive axis (3), with the idle chuck assembly extending downward out of the way. A spring biased clutch mechanism (70) allows for disengagement of a chuck shaft (30) from a drive shaft (20) of the drill by pulling on the chuck (28) to switch between chuck assemblies (26A,26B). A frusto-conical ramp (90 or 94) is engaged by a chuck half (72) of the clutch mechanism as the turret is swiveled to gradually retract the chuck half (72) against the spring bias so that the chuck half is automatically urged into operative engagement with a drive half (74) of the clutch mechanism upon alignment therewith.

19 Claims, 6 Drawing Sheets

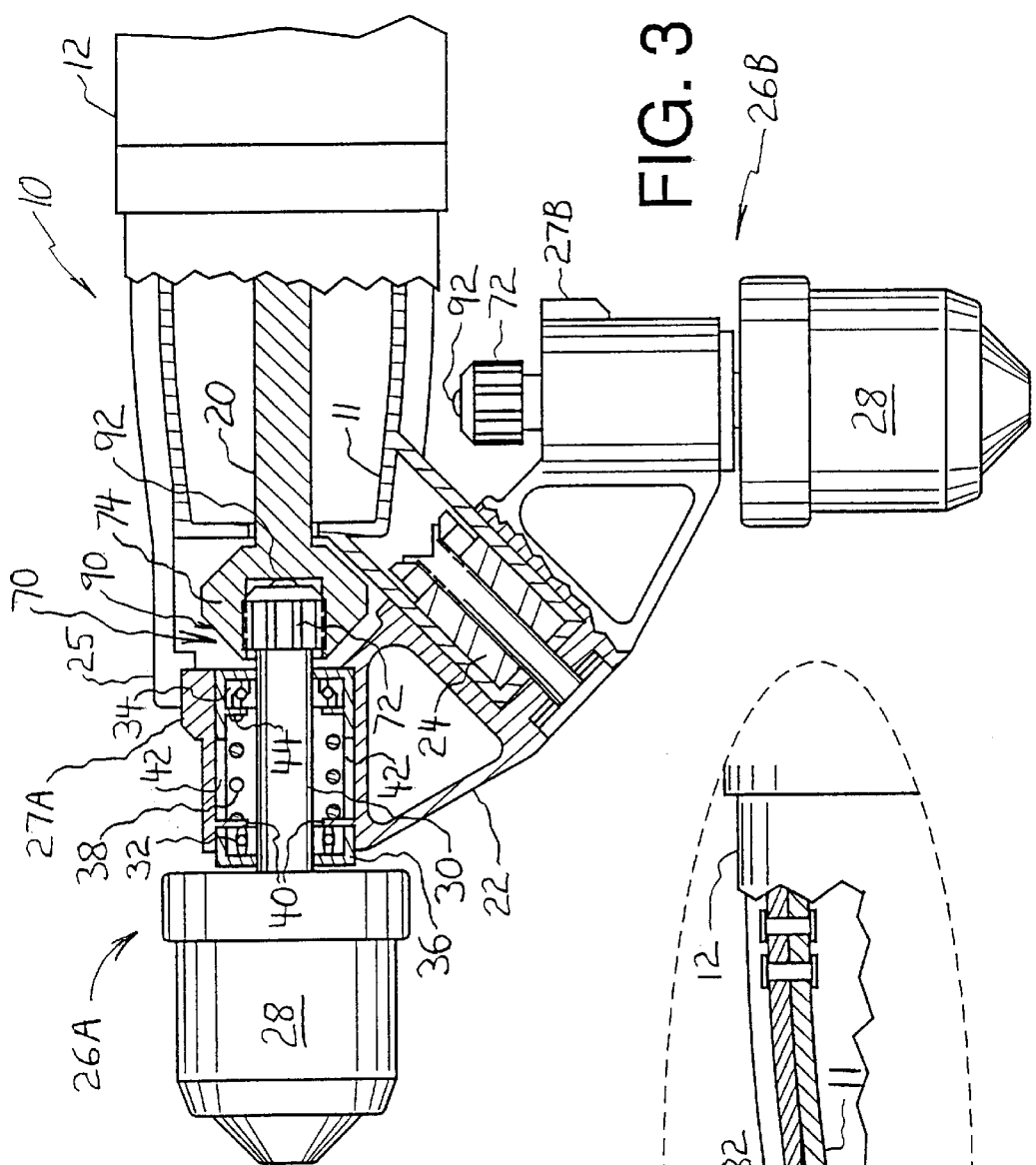

TURRET HAND DRILL

CROSS-REFERENCE TO RELATED APPLICATIONS

The present application is the U.S. national phase of International Application No. PCT/US00/09080 filed Apr. 5, 2000, and claims priority of U.S. Provisional Application Ser. No. 60/153,181 filed Sep. 10, 1999.

FIELD OF THE INVENTION

The present invention relates to powered hand tools, and more particularly to a hand-operated turret drill for quickly changing between a pair of rotary tools such as a drill bit and screwdriver.

DESCRIPTION OF THE RELATED ART

Most multi-operations that are done with a hand drill are done using two tools: for example, a masonry hand drill bit and a screwdriver. With conventional hand drills having a single chuck for holding a tool, one must continually change back and forth between the two tools while not dropping or losing the idle tool.

It is known in the art of motor-driven hand tools to provide a magazine carrying a plurality of different tools and means for selecting a desired tool by aligning the tool with a chuck axis, sliding or moving the tool into place, and tightening the chuck. If another tool occupies the chuck, the tool change operation necessarily includes the initial step of loosening the chuck and returning the prior tool to its location in the magazine. Although designs of this nature are useful for eliminating the problem of lost tools, they do not significantly decrease the time involved in changing between tools. See, for example, U.S. Pat. Nos. 1,022,711; 4,604,005; 4,928,381; 5,022,131; 5,065,498; and 5,893,685.

It is further known in the art to provide a hand drill with a turret having a plurality of chucks for holding different tools, whereby the turret is rotated about an axis offset in parallel relation to the drive axis of the drill to select a desired tool. However, in designs of this type, the individual tool-holding chucks of the turret, and the tool shanks themselves, are often of a specialized reduced design in order to keep the hand drill to a reasonably compact and useful size. Consequently, conventionally sized tool-gripping chucks, and conventionally sized tools held thereby, are not well accommodated by these designs. See, for example, GB 1,073,681 and U.S. Pat. No. 2,679,770.

A problem common to both the single-chuck "magazine" designs and the multiple-chuck "turret" designs mentioned above is that the idle tools extend beyond the profile of a conventional hand drill, thereby compromising the compactness and utility of such drills.

SUMMARY OF THE INVENTION

Therefore, it is an object of the present invention to provide a hand turret drill with the utility to quickly change back and forth between two different tools without having to adjust a chuck each time.

It is another object of the present invention to provide a hand turret drill that accommodates tools of conventional size and shank design.

It is yet another object of the present invention to provide a hand turret drill with a turret that normally resides entirely within an end view projected silhouette of a conventional hand drill.

In furtherance of these and other objects, a turret hand drill formed in accordance with a preferred embodiment of the present invention comprises a drill housing enclosing a drill frame and drive means, and a two-chuck turret mounted on the drill frame near a forward portion of the drill for swiveling motion about a pivot axis between a pair of releasably locked index positions wherein a selected chuck is drivably connected to the drive means by a clutch mechanism. The pivot axis of the turret extends downwardly and forwardly from the forward portion of the drill housing at an angle displaced from the rotational tool drive axis of the drill, and a pair of chuck assemblies are arranged symmetrically about the turret pivot axis such that the respective rotational axes of the two chucks are coplanar with the turret pivot axis. Accordingly, when one of the chucks is positioned with its rotational axis aligned with the drill tool drive axis, swiveling the turret one-hundred eighty degrees about the turret pivot axis will switch the positions of the chucks to bring the rotational axis of the other chuck into alignment with the drill tool drive axis.

Each chuck assembly includes a chuck, a chuck shaft with a chuck half of the clutch, chuck shaft bearings, a bearing housing, and a clutch retraction spring. In one embodiment, the bearing housing is mounted in a bore in the turret and is biased by the clutch retraction spring so that the bearing housing and chuck shaft are forced to engage the chuck half of the clutch with a drive half of the clutch. This also locks the turret in place. Pulling on the chuck disengages the chuck half of the clutch from the drive half of the clutch so that the turret can be rotated about the pivot axis.

BRIEF DESCRIPTION OF THE DRAWINGS

The nature and mode of operation of the present invention will now be more fully described in the following detailed description of the preferred embodiments taken with the accompanying drawing figures, in which:

FIG. 3 is an enlarged partially sectioned view showing a turret of the hand turret drill;

FIG. 4 is an enlarged sectional view showing a proposed supplemental locking device of the present invention;

DETAILED DESCRIPTION OF THE INVENTION

Figure 1:
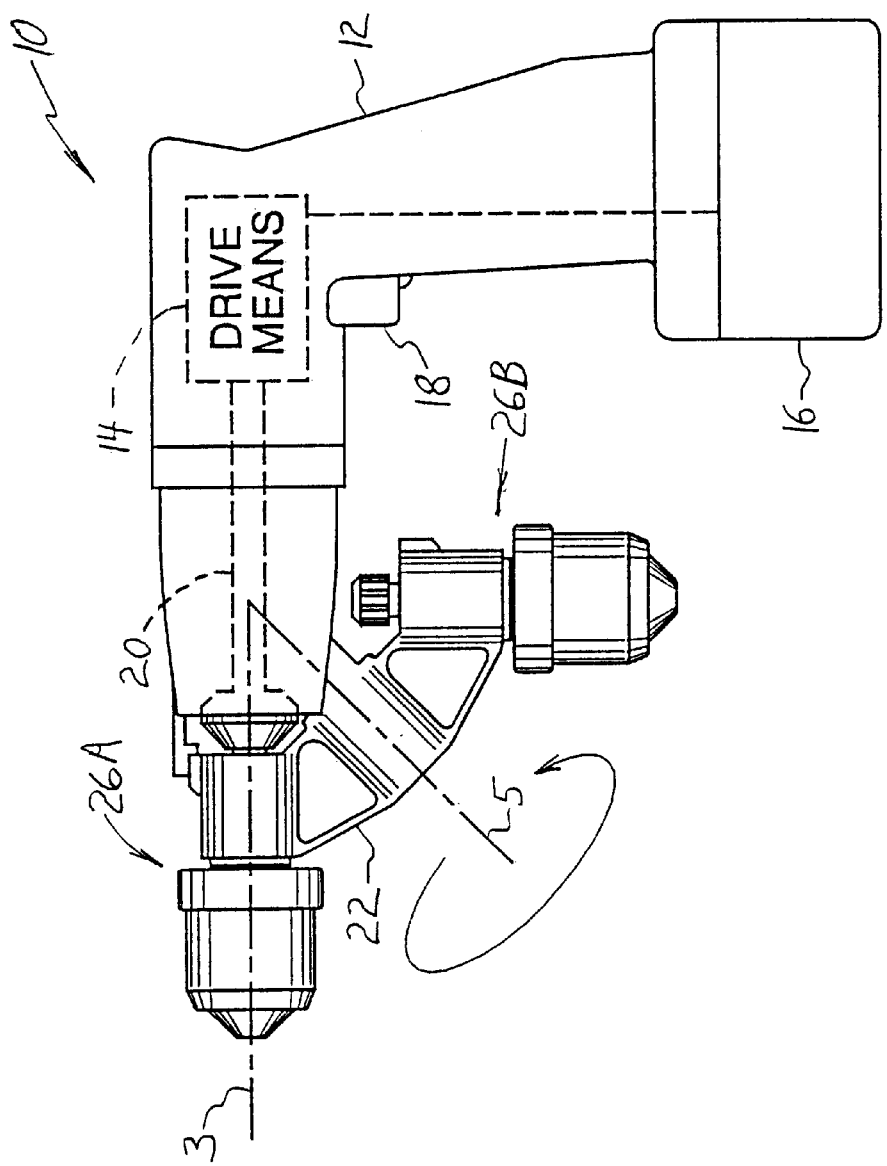
FIG. 1 is a partially sectioned side view showing a hand turret drill formed in accordance with a preferred embodiment of the present invention.
Figure 2:
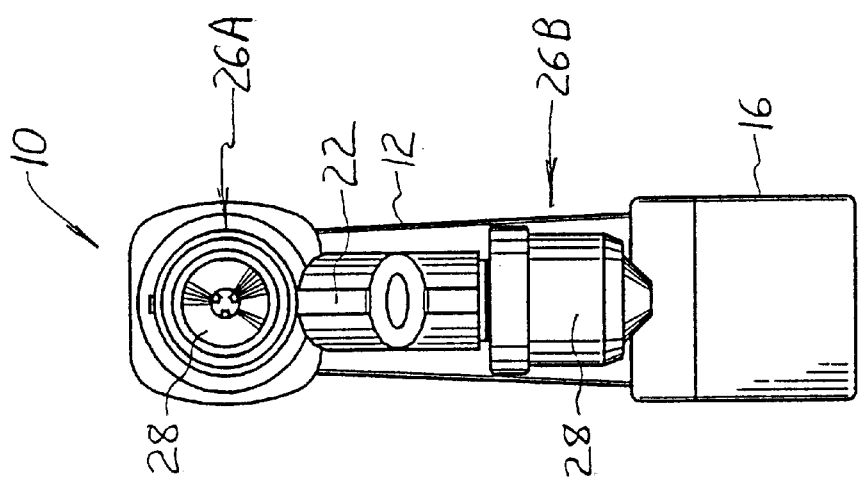
FIG. 2 is a front elevational view of the hand turret drill shown in FIG. 1.

Referring initially to FIGS. 1 and 2, a hand turret drill formed in accordance with a preferred embodiment of the present invention is shown and designated generally by the reference numeral 10. Drill 10 comprises a frame 11 enclosed by a housing 12. Frame 11 supports an automatic drive means 14 energized by a rechargeable power source 16 detachably mounted on housing 12. Drive means 14 can be in the form of an electric motor cooperating with a gear train (not shown) or directly arranged to rotate a drive shaft 20 about a tool drive axis 3 of the drill. Drill 10 is operable using a finger trigger control 18 extending through housing 12. The structure of drill 10 described to this point is conventional in nature.

Referring also now to FIG. 3, drill 10 departs from the prior art by further comprising a turret 22 mounted near a forward portion of frame 11 by a central swivel bearing 24 for rotation about a pivot axis 5 that extends downwardly and forwardly from the forward portion of the drill frame and housing at an angle displaced from the rotational tool drive axis 3 of drill 10. The angle between tool drive axis 3 and pivot axis 5 is preferably, but not necessarily, about forty-five degrees. Turret 22 includes a pair of chuck assemblies 26A and 26B arranged in angular symmetry about the turret pivot axis 5 such that the respective rotational axes of the two chuck assemblies are coplanar with the turret pivot axis. It will be understood from the turret configuration described above that when one of the chuck assemblies is positioned in axial alignment with drill tool axis 3, the other chuck assembly can be moved into axial alignment with drill tool axis 3 by swiveling turret 22 one-hundred eighty degrees about pivot axis 5. An optional detent 25 is arranged atop housing 12 for engagement by alignment members 27A and 27B provided adjacent respective chuck assemblies 26A and 26B to prevent "over swiveling" of turret 22 about pivot axis 5 during a change between chucks. It will be noted from FIG. 2 that when chuck assembly 26A or chuck assembly 26B is axially aligned with drill tool axis 3, the outline of turret 22 and chuck assemblies 26A,26B is contained entirely within the confines of the silhouette of drill 10 as viewed along drill tool axis 3.

Each chuck assembly 26A,26B includes a standard-sized chuck 28 at a distal end of a chuck shaft 30 for holding a drill bit, screwdriver, or other tool adapted for driven rotation by a hand drill. Turret 22 is shaped so it does not extend further forward than the back of chuck 28. In order to permit chuck 28 to be selectively coupled to and uncoupled from drive shaft 20, a retractable clutch mechanism 70 is provided that includes a chuck half 72 at a proximal end of chuck shaft 30 and a drive half 74 at a distal end of drive shaft 20. The clutch halves 72 and 74 can be interlocking splines or other mating tooth and groove configuration that enables clutch mechanism 70 to transmit torque from drive shaft 20 to chuck shaft 30, guide and restrain the clutch shaft in accurate alignment with the drive shaft, and lock the turret from unintended swiveling about pivot axis 5.

Figure 5:
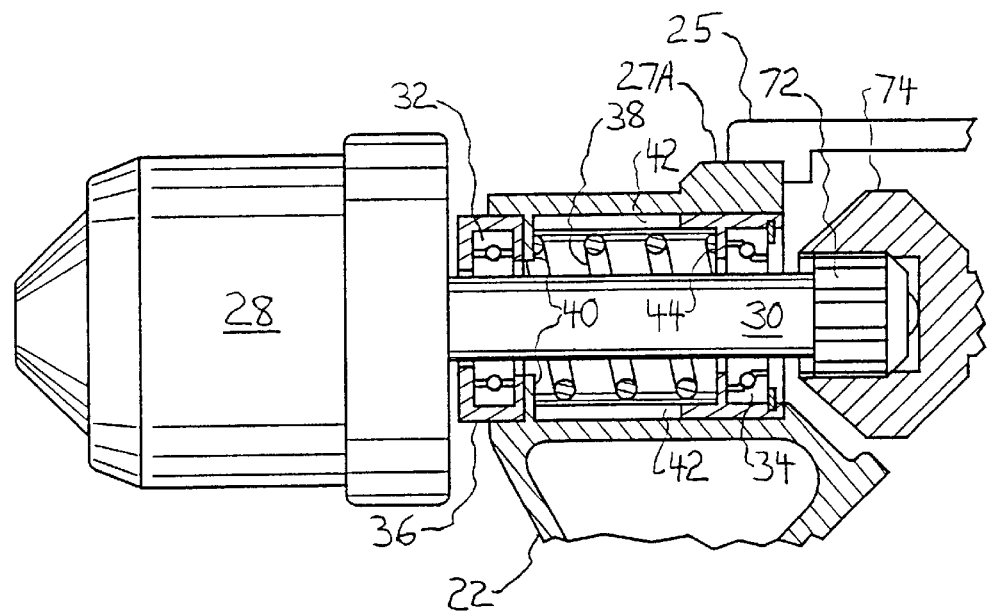
FIG. 5 is an enlarged sectional viewing showing a retractable chuck assembly of the turret hand drill in a torque transmitting condition.
Figure 6:
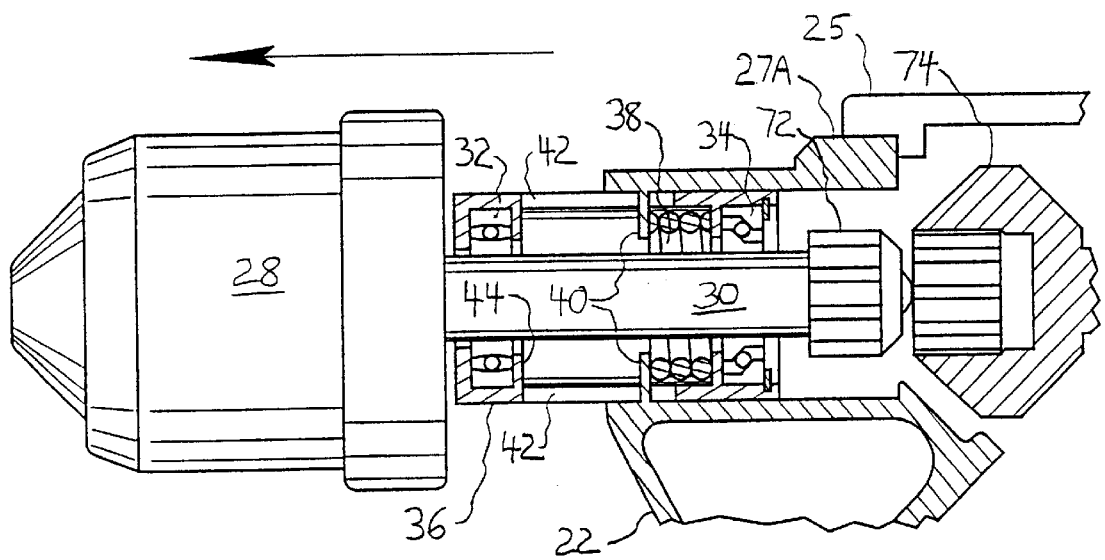
FIG. 6 is a view similar to that of FIG. 5, however showing the retractable chuck assembly of FIG. 5 in a retracted condition.

Pursuant to one possible embodiment shown in FIGS. 5 and 6, the chuck shaft 30 is supported for rotation about its longitudinal axis by a pair of shaft bearings 32 and 34 situated within a bearing housing 36, which is itself slidably supported within a bore 37 in turret 22. The inner races of shaft bearings 32 and 34 are press fitted onto chuck shaft 30, and the outer races of shaft bearings 32 and 34 are press fitted within bearing housing 36, such that axially directed sliding motion between chuck shaft 30, shaft bearings 32 and 34, and bearing housing 36 is prevented and the parts move as a unit. A clutch retraction spring 38 is arranged co-axially about chuck shaft 30. A distal end of clutch retraction spring 38 engages protrusions 40 extending radially through axially extending travel slots 42 in the sidewall of bearing housing 36, and a proximal end of the spring engages an internal step 44 in the sidewall of the bearing housing, whereby the spring urges the bearing housing including chuck shaft 30 rearward toward drive shaft 20.

Figure 7:
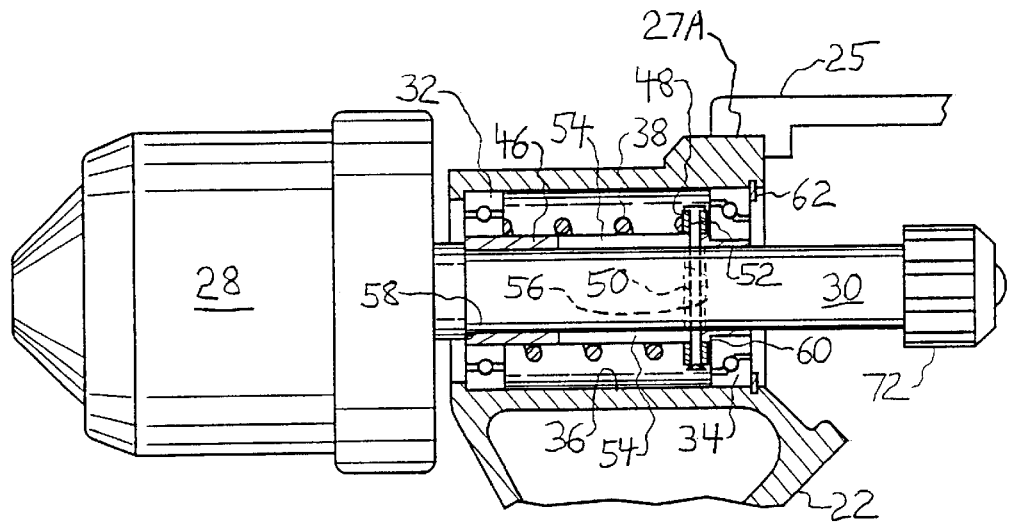
FIG. 7 is an enlarged sectional viewing showing an alternative retractable chuck assembly in a torque transmitting condition.
Figure 8:
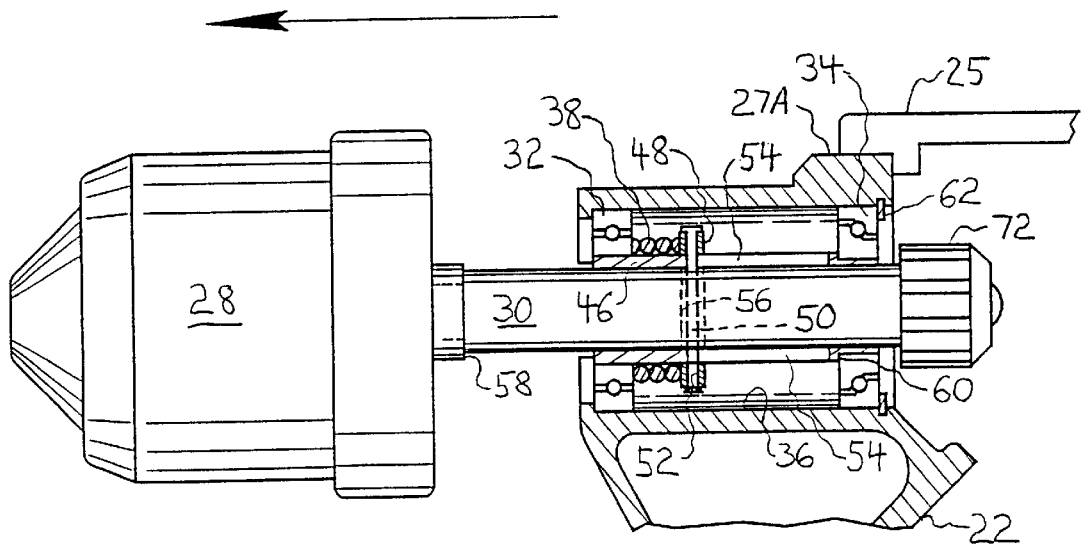
FIG. 8 is a view similar to that of FIG. 7, however showing the retractable chuck assembly of FIG. 7 in a retracted condition.

FIGS. 7 and 8 show an alternative construction of chuck assemblies 26A,26B wherein chuck shaft 30 is slidably received in a sleeve 46 which in turn is rotatably supported by shaft bearings 32 and 34 within bearing housing 36, which is integrally formed as part of turret 22. Clutch retraction spring 38 is arranged co-axially about chuck shaft 30 and sleeve 46 with the spring's distal end engaging bearing 32 and its proximal end engaging an annular spring seat 48. Spring seat 48 is fixed relative to sleeve 46 and chuck shaft 30 by a travel pin 50 radially received through a hole 52 through the spring seat, opposite travel slots 54 through sleeve 46, and a hole 56 through the chuck shaft. Chuck shaft 30 is provided with a radially enlarged distal portion that defines a shoulder 58 in engagement with a distal end of sleeve 46. Likewise, another shoulder 60 is defined by a radial step in the outer wall of sleeve 46 and engages bearing 34, which is chosen as a thrust bearing. A retaining ring 62 is provided within an internal annular groove near the proximal end of bearing housing 36 to keep bearing 34 within bearing housing 36. In the construction of FIGS. 7 and 8, chuck shaft 30 is biased toward clutch engagement with drive shaft 20 by retraction spring 38, however it is possible to pull chuck 28 to the left as seen in FIG. 8 against the urging of retraction spring 38 such that chuck shaft 30 slides in an axial direction relative to sleeve 46 while travel pin 50 travels within travel slots 54, which are elongated in the axial direction.

Figure 9:
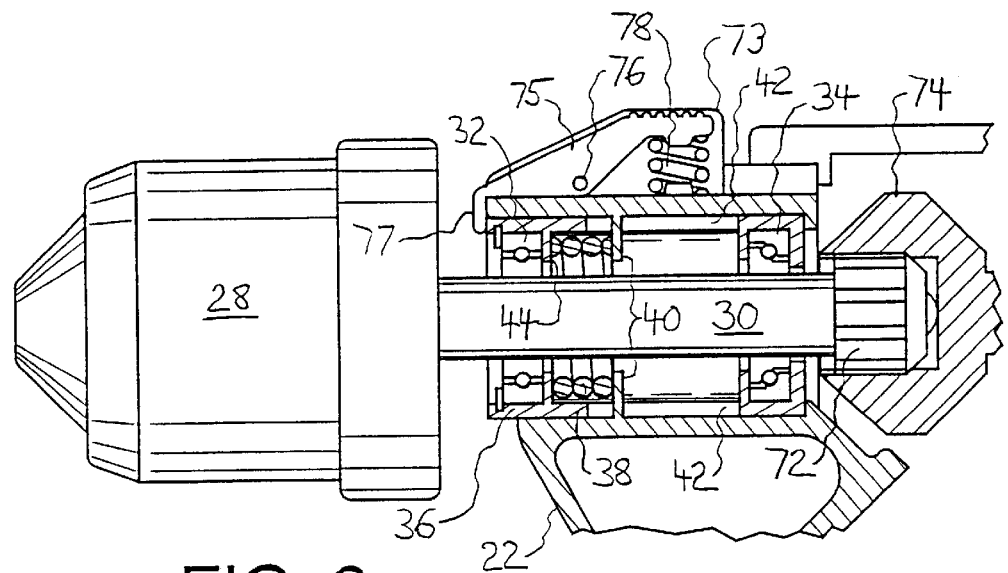
FIG. 9 is an enlarged sectional viewing showing another alternative retractable chuck assembly in a torque transmitting condition.
Figure 10:
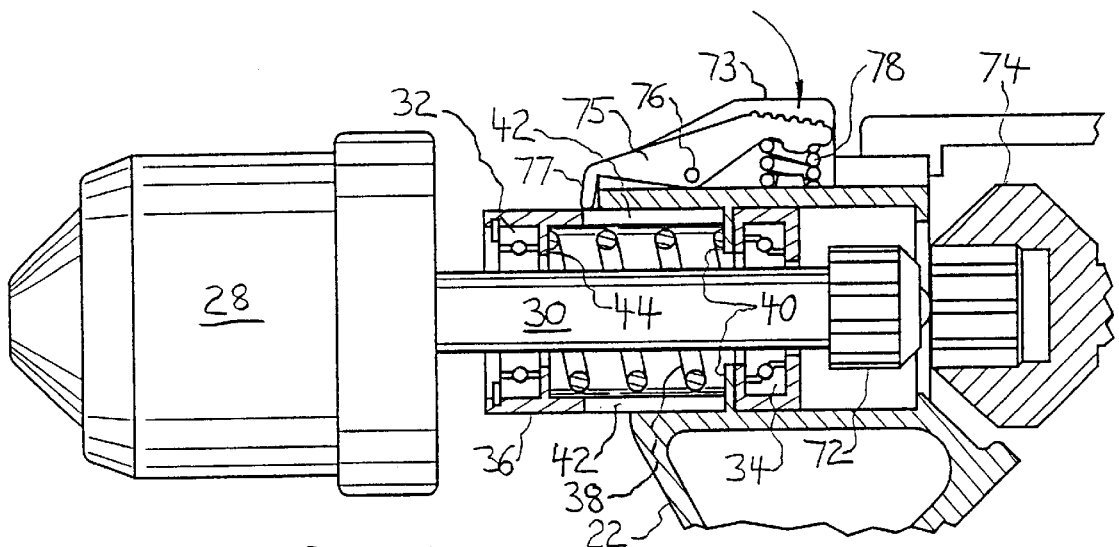
FIG. 10 is a view similar to that of FIG. 9, however showing the retractable chuck assembly of FIG. 9 in a retracted condition.
Figure 11:
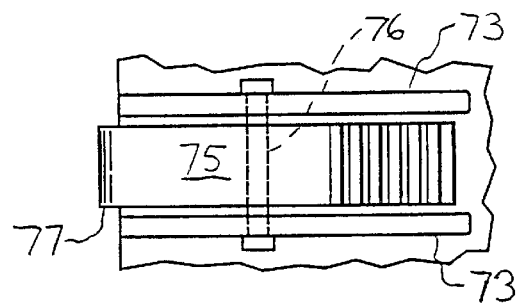
FIG. 11 is a top plan view of a thumb latch mechanism for the retractable chuck assembly shown in FIGS. 9 and 10.

FIGS. 9–11 show another alternative arrangement for supporting and biasing the chuck shaft. The arrangement is similar to that described in connection with FIGS. 5 and 6, however protrusions 40 and internal step 44 are reversed such that chuck shaft 30 is urged outward away from drive shaft 20. To maintain clutch engagement between chuck half 72 and drive half 74, a retainer latch 75 is mounted to upstanding guard walls 73 on turret 22 by a pivot pin 76 just above associated bearing housing 36. Retainer latch 75 includes a downwardly depending retainer tab 77 at a distal end thereof for retaining bearing housing 36, shaft bearings 32 and 34, and chuck shaft 30 pushed inward against the bias of retraction spring. A depressible spring 78 located opposite retainer tab 77 normally urges retainer latch 75 pivotally about pivot pin 76 toward a locking position. Consequently, as depicted in FIG. 10, thumb pressure exerted on retainer latch 75 to depress spring 78 serves to remove retainer tab 77 and allow clutch disengagement of chuck half 72 from drive half 74 under the outwardly directed biasing force of retraction spring 38.

In the biasing configurations disclosed above, a mechanical spring is disclosed as biasing means, however it will be appreciated that alternative biasing means are known to persons of ordinary skill in the art, including gas springs and magnetic biasing means.

An additional, separate locking device 80, shown in FIG. 4, is preferably provided to prevent clutch mechanism 70 from disengaging should an overwhelming tension be applied to the clutch for any reason. Locking device 80 includes a spring latch 82 mounted atop drill frame 11 and having an opening 84 for receiving a catch member 86 on bearing housing 36, thereby preventing the bearing housing and the chuck half 82 of the clutch from retracting. Locking device 80 is released by pressing spring latch 82 downward while pulling chuck 28 forward against the bias of spring 38.

Figure 12:
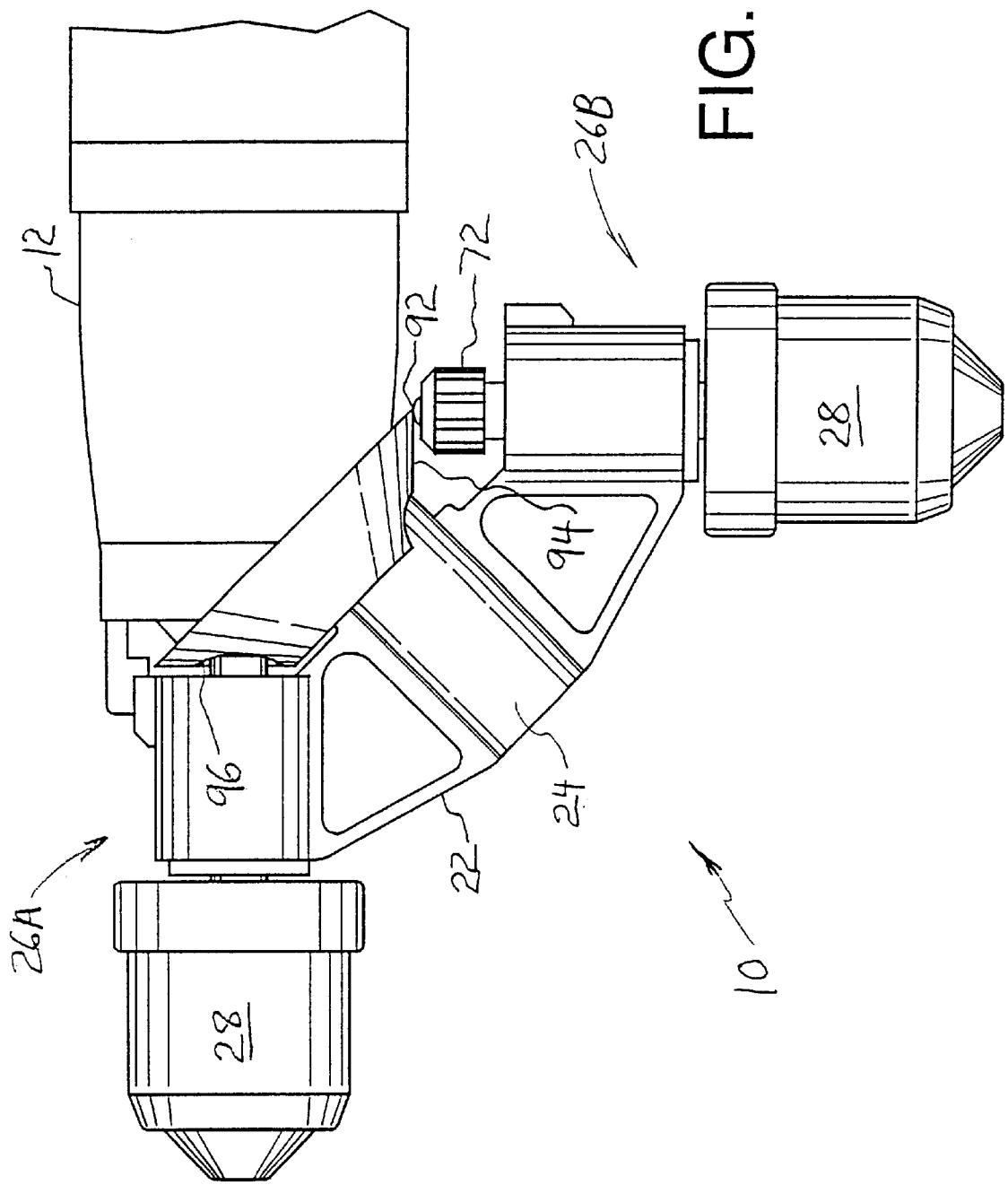
FIG. 12 is a view similar to that of FIG. 2, however showing an external lifting ramp for a drop-in clutch feature of the present invention.

FIGS. 3 and 12 illustrate alternative embodiments incorporating an optional "drop-in" clutch feature of the present invention useful with inwardly biased chuck assemblies exemplified in FIGS. 5–8. FIG. 3 shows drive half 74 of clutch mechanism 70 as including an outer frusto-conical ramp 90 along which a rounded head 92 of each chuck half 72 rides during swiveling of turret 22 until "drop in" alignment is achieved. Ramp 90 facilitates adjustment between chuck assemblies 26A and 26B by gradually moving the newly selected chuck assembly to a retracted condition without need to manually pull on the newly selected chuck during changeover. As will be appreciated, once chuck half 72 becomes aligned with drive half 74, it will automatically "drop in" for engagement with drive half 74 due to the bias of spring 38 and will be limited from traveling beyond the alignment point by locking device catch member 86 engaging locking device opening 84, or alternatively by detent 25 and alignment member 27A or 27B, as previously described.

In the embodiment of FIG. 12, a frusto-conical ramp 94 is mounted externally of drill housing 12 with its central axis spaced from and parallel to turret pivot axis 5. Ramp 94 includes a passage 96 aligned along tool drive axis 3, and rounded head 92 rides along an outer surface of ramp 94 as turret 22 is swiveled about pivot axis 5 until it aligns with passage 96, at which point the chuck half 72 will automatically be urged into engagement with the drive half 74 of clutch mechanism 70 by retraction spring 38.

The manner of using drill 10 will now be described. Chucks 28 associated with chuck assemblies 26A and 26B are each loosened, loaded with a tool shank of a selected tool, and tightened individually in a conventional manner. Assuming chuck assembly 26A is aligned and locked in operating position, the operator can quickly change to use the tool held by chuck assembly 26B by pressing spring latch 82, pulling chuck 28 of chuck assembly 26A forward to release clutch mechanism 70, and swiveling turret 22 one-hundred eighty degrees about pivot axis 5 until chuck assembly 26B is aligned with drill tool axis 3 so that chuck half 72 is forced into engagement with drive half 74 and catch member 86 is resiliently guided through opening 84 until locking of the turret from further rotation occurs. If the chuck assembly is outwardly biased as shown in FIGS. 9–11, thumb latch 75 must be depressed to release the clutch engagement and the newly selected chuck must be pushed inward to engage the clutch mechanism prior to releasing pressure on the thumb latch.

The turret hand drill of the present invention permits an operator to repeatedly drill a hole and drive in a screw, without having to stop and replace the tools in the chuck each time. Moreover, the turret hand drill as described herein can be used without interference in all of the spaces available to a non-turreted drill, except for possibly a small overall length disadvantage. When turret 22 is locked in an operating position, all axes are in the central plane of the power drill and power drill handle. The design of the present invention also serves to position the idle tool and its holder so as to be well away from the working surface, and to have its longitudinal axis extending downwards generally parallel to the drill handle.

What is claimed is:

1. A turret hand drill comprising:

a drill frame;

a drive shaft supported by said drill frame for rotation about a drive axis;

a turret mounted on said drill frame for rotation about a pivot axis, said pivot axis being angularly displaced from said drive axis;

a plurality of chucks carried by said turret, wherein a selected one of said plurality of chucks is moved into driven connection with said drive shaft; and, a detent and said turret includes a plurality of alignment members associated one with each of said plurality of chucks, said detent being arranged for engagement by a respective one of said alignment members to block rotation of said turret about said pivot axis in one angular direction and thereby align said rotational axis of said selected one of said plurality of chucks with said drive axis.

2. A turret hand drill comprising:

a drill frame;

a drive shaft supported by said drill frame for rotation about a drive axis;

a turret mounted on said drill frame for rotation about a pivot axis, said pivot axis being angularly displaced from said drive axis; and, a plurality of chucks carried by said turret, wherein a selected one of said plurality of chucks is moved into driven connection with said drive shaft, each of said plurality of chucks having a rotational axis arranged coplanar with said pivot axis of said turret.

3. A turret hand drill comprising:

a drill frame;

a drive shaft supported by said drill frame for rotation about a drive axis;

a turret mounted on said drill frame for rotation about a pivot axis, said pivot axis being angularly displaced from said drive axis;

a plurality of chucks carried by said turret, wherein a selected one of said plurality of chucks is moved into driven connection with said drive shaft; and, a catch member traveling with a chuck shaft of said selected one of said plurality of chucks and a spring latch mounted on said drill having an opening for releasably receiving said catch member when said selected one of said plurality of chucks is in driven connection with said drive shaft.

4. A turret hand drill comprising:

a drill frame;

a drive shaft supported by said drill frame for rotation about a drive axis;

a turret mounted on said drill frame for rotation about a pivot axis, said pivot axis being angularly displaced from said drive axis;

a plurality of chucks carried by said turret, wherein a selected one of said plurality of chucks is moved into driven connection with said drive shaft, each of said plurality of chucks has a rotational axis, said rotational axis of said selected one of said plurality of chucks is aligned with said drive axis, and each of said plurality of chucks includes a chuck shaft defining said rotational axis; and, a biasing means for urging said chuck shaft of said selected one of said plurality of chucks into torque transmitting engagement with said drive shaft.

5. The turret hand drill according to claim 4, wherein said biasing means includes a spring arranged coaxially about said chuck shaft.

6. The turret hand drill according to claim 4, wherein said chuck shafts of said plurality of chucks are operatively arranged to disengage from said drive shaft when said selected one of said plurality of chucks is pulled against the urging of said biasing means, such that said turret can be rotated about said pivot axis.

7. The turret hand drill according to claim 4, wherein each of said chuck shafts includes a chuck half of a clutch mechanism and said drive shaft includes a drive half of a clutch mechanism for releasable torque transmitting engagement between said chuck shaft and said drive shaft.

8. The turret hand drill according to claim 7, wherein said drive half of said clutch mechanism includes a frusto-conical outer ramp surface and said chuck half of said clutch mechanism includes a rounded head adapted to ride on said ramp surface during rotation of said turret about said pivot axis.

9. The turret hand drill according to claim 4, wherein said drill further comprises an external frusto-conical ramp and said chuck half of said clutch mechanism includes a rounded head, said ramp being arranged for riding engagement by said rounded head during rotation of said turret about said pivot axis.

10. The turret hand drill according to claim 4, further comprising a retainer latch movable between a locking position for maintaining said chuck shaft of said selected one of said plurality of chucks in torque transmitting engagement with said drive shaft against the urging of said biasing means and an unlocking position for allowing said selected one of said plurality of chucks to be urged away from torque transmitting engagement with said drive shaft by said biasing means.

11. The turret hand drill according to claim 10, wherein said biasing means includes a spring arranged coaxially about said chuck shaft.

12. The turret hand drill according to claim 4, further comprising a catch member traveling with said chuck shaft of said selected one of said plurality of chucks and a spring latch mounted on said drill having an opening for releasably receiving said catch member when said selected one of said plurality of chucks is in driven connection with said drive shaft.

13. The turret hand drill according to claim 4, wherein said plurality of chucks is a pair of chucks.

14. The turret hand drill according to claim 13, wherein said rotational axes of said pair of chucks are arranged coplanar with said pivot axis of said turret.

15. The turret hand drill according to claim 14, wherein said rotational axes of said pair of chucks are arranged in angular symmetry about said pivot axis of said turret.

16. The turret hand drill according to claim 15, wherein each of said rotational axes is angularly displaced by 45 degrees from said pivot axis of said turret.

17. The turret hand drill according to claim 14, wherein said drill further comprises a detent and said turret includes a pair of alignment members associated one with each of said pair of chucks, said detent being arranged for engagement by a respective one of said pair of alignment members to align said rotational axis of said selected one of said pair of chucks with said drive axis.

18. The turret hand drill according to claim 4, wherein said drill further comprises a detent and said turret includes a plurality of alignment members associated one with each of said plurality of chucks, said detent being arranged for engagement by a respective one of said alignment members to block rotation of said turret about said pivot axis in one angular direction and thereby align said rotational axis of said selected one of said plurality of chucks with said drive axis.

19. A turret hand drill comprising:

a drill frame;

a drive shaft supported by said drill frame for rotation about a drive axis;

a turret mounted on said drill frame for rotation about a pivot axis, said pivot axis being angularly displaced from said drive axis;

a plurality of chucks carried by said turret, wherein a selected one of said plurality of chucks is moved into driven connection with said drive shaft; and, biasing means for urging a chuck shaft of said selected one of said plurality of chucks into torque transmitting engagement with said drive shaft.

\* \* \* \* \*